US011978378B2

(12) United States Patent
Hoffman et al.

(10) Patent No.: US 11,978,378 B2
(45) Date of Patent: May 7, 2024

(54) PIXEL ARRANGEMENT FOR MULTI-RESOLUTION DISPLAY PANEL

(71) Applicant: Google LLC, Mountain View, CA (US)

(72) Inventors: David Morris Hoffman, Fremont, CA (US); Sangmoo Choi, Palo Alto, CA (US); Sun-il Chang, San Jose, CA (US); Ion Bita, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/880,223

(22) Filed: Aug. 3, 2022

(65) Prior Publication Data

US 2022/0375385 A1 Nov. 24, 2022

Related U.S. Application Data

(63) Continuation of application No. 16/945,331, filed on Jul. 31, 2020, now Pat. No. 11,410,591.

(60) Provisional application No. 62/881,918, filed on Aug. 1, 2019.

(51) Int. Cl.
*G09G 3/20* (2006.01)
*G09G 3/3208* (2016.01)

(52) U.S. Cl.
CPC ......... *G09G 3/2003* (2013.01); *G09G 3/3208* (2013.01); *G09G 2300/0452* (2013.01); *G09G 2360/144* (2013.01)

(58) Field of Classification Search
CPC ............... G09G 3/2003; G09G 3/3208; G09G 2300/0452; G09G 2360/144
See application file for complete search history.

(56) References Cited

U.S. PATENT DOCUMENTS

| | | | | |
|---|---|---|---|---|
| 7,948,507 | B2 | 5/2011 | Okada et al. | |
| 8,754,913 | B2 | 6/2014 | Hwang et al. | |
| 9,770,412 | B2 | 9/2017 | Mendelsohn et al. | |
| 2016/0293679 | A1* | 10/2016 | Xu | H10K 59/352 |
| 2017/0186359 | A1* | 6/2017 | Lee | G09G 3/2003 |
| 2018/0190729 | A1* | 7/2018 | Chu-Ke | G09G 3/3607 |
| 2018/0226386 | A1* | 8/2018 | Cok | H01L 27/124 |
| 2019/0140030 | A1 | 5/2019 | Huangfu et al. | |
| 2019/0319079 | A1* | 10/2019 | Xing | G09G 3/3225 |
| 2019/0385516 | A1* | 12/2019 | Yang | G09G 3/3607 |
| 2021/0027751 | A1* | 1/2021 | Tang | G09G 5/14 |

FOREIGN PATENT DOCUMENTS

CN 105243980 B * 1/2016 ........... G09G 3/3648

* cited by examiner

*Primary Examiner* — Stacy Khoo
(74) *Attorney, Agent, or Firm* — Fish & Richardson P.C.

(57) ABSTRACT

A display panel includes a first set of pixels that each include a respective red sub-pixel and a respective green sub-pixel and a second set of pixels that each include a respective blue sub-pixel and a respective green sub-pixel, where the first set of pixels and the second set of pixels are arranged on the display panel such that at least one side of each of the pixels in the first set of pixels is adjacent to at least one of the pixels in the second set of pixels, at least one side of each of the pixels in the first set of pixels is not adjacent to any pixel, and the green sub-pixels are arranged on the display panel such that the green sub-pixels are evenly distributed in the display panel.

13 Claims, 7 Drawing Sheets

PIXEL ARRANGEMENT FOR MULTI-RESOLUTION DISPLAY PANEL

CROSS-REFERENCE TO RELATED APPLICATIONS

This application is a continuation of U.S. application Ser. No. 16/945,331 filed Jul. 31, 2020, which claims the benefit of U.S. Provisional Patent Application No. 62/881,918 filed Aug. 1, 2019 and entitled "PIXEL ARRANGEMENT FOR MULTI-RESOLUTION DISPLAY PANEL," which are incorporated herein by reference in its entirety.

BACKGROUND

Electronic devices include those with both sensors and displays.

SUMMARY

This document describes techniques, methods, systems, and other mechanisms for constructing a multi-resolution display panel that incorporates lower resolution areas that reduce image degradation in the lower resolution areas. A multi-resolution display panel may be used so that a camera may be placed behind an area of the display panel that has a lower resolution so that the display panel causes less degradation in quality of images captured by the camera compared to placing the camera behind a region of the display with higher resolution. For example, the display panel may have more open spaces in the area that has lower resolution so that light that passes through the display panel in that area undergoes less interference (e.g., attenuation, diffraction and/or scatter) than light that passes through the display panel in an area with higher resolution. Similarly, various sensors such as an ambient light sensor, depth sensor, or some other sensor may additionally or alternatively be placed behind the area with lower resolution to reduce interference caused by the display panel.

However, a lower resolution area on the display may present images with image degradation compared to a higher resolution area. For example, the lower resolution area may display images with aliasing of detailed content, or exhibit greater non-uniform luminance (in some case referred to as screen door effect) than the higher resolution area displays. Pixels in the lower resolution area of a multi-resolution display panel may be arranged to reduce image degradation.

Generally, the pixels in the lower resolution area may be arranged so that green sub-pixels are evenly distributed in the display panel. For example, the pixels in the multi-resolution display panel may be arranged so that the higher resolution area includes green sub-pixels in a grid and the lower resolution area includes green sub-pixels arranged in a diamond pattern.

One innovative aspect of the subject matter described in this specification is embodied in a display panel that includes a first set of pixels that each include a respective red sub-pixel and a respective green sub-pixel and a second set of pixels that each include a respective blue sub-pixel and a respective green sub-pixel, where the first set of pixels and the second set of pixels are arranged on the display panel such that at least one side of each of the pixels in the first set of pixels is adjacent to at least one of the pixels in the second set of pixels, at least one side of each of the pixels in the first set of pixels is not adjacent to any pixel, and the green sub-pixels are arranged on the display panel such that the green sub-pixels are evenly distributed in the display panel.

The foregoing and other embodiments can each optionally include one or more of the following features, alone or in combination. For instance, in some aspects the first set of pixels and the second set of pixels are arranged along a grid where the green sub-pixels are spaced apart every four columns and between each row the green sub-pixels are offset by two columns. In certain aspects, a position of the green sub-pixels in the first set of pixels relative to the red sub-pixels is different than a position of the green sub-pixels in the second set of pixels relative to the blue sub-pixels.

In some implementations, the pixels of the first set of pixels are spaced apart every four columns and every two rows, and are not offset from one another between rows, and the pixels of the second set of pixels are also spaced apart every four columns and every two rows, and are not offset from one another between rows. In certain aspects, the pixels of the first set of pixels are spaced apart every four columns and every two rows, and are offset from one another by two columns every two rows, and the pixels of the second set of pixels are also spaced apart every four columns and every two rows, and are offset from one another by two columns every two rows.

In some aspects, the first set of pixels and the second set of pixels are arranged along a grid where the green sub-pixels are spaced apart every two columns and every two rows. In some implementations, the first set of pixels and the second set of pixels are clustered into clusters of two by two pixels that each include two of the pixels of the first set of pixels adjacent to each other and two of the pixels of the second set of pixels that are also adjacent to each other. In certain aspects, a position of the green sub-pixels in the first set of pixels relative to the red sub-pixels is different than a position of the green sub-pixels in the second set of pixels relative to the blue sub-pixels. In some aspects, the clusters are spaced apart in a period which is four columns and four rows and are not offset from one another between rows.

In some implementations, the clusters are spaced apart in a period which is four columns and four rows and are offset from one another by two columns every two rows. In certain aspects, sub-pixels of a same color in a particular cluster are driven by a single pixel circuit. In some aspects, sub-pixels of a same color in a particular cluster are driven by different pixel circuits that have a shared address line. In some implementations, sub-pixels of a same color in a particular cluster are driven by with a shared column data signal. In certain aspects, the green sub-pixels are shifted relative to the pixel circuits for driving the green sub-pixels differently from green sub-pixels in a high resolution region such that the green-sub-pixels are not directly above the pixel circuits for driving the green sub-pixels.

Another innovative aspect of the subject matter described in this specification is embodied in a display panel that includes a first set of pixels that each include a respective red sub-pixel and a respective green sub-pixel and a second set of pixels that each include a respective green sub-pixel and a respective green sub-pixel, where the first set of pixels and the second set of pixels are arranged on the display panel such that at least one side of each of the pixels in the first set of pixels is not adjacent to any pixel, and the first set of pixels and the second set of pixels are arranged along a grid where the green sub-pixels are spaced apart every six columns and between each row the green sub-pixels are offset by two columns.

Details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1A:
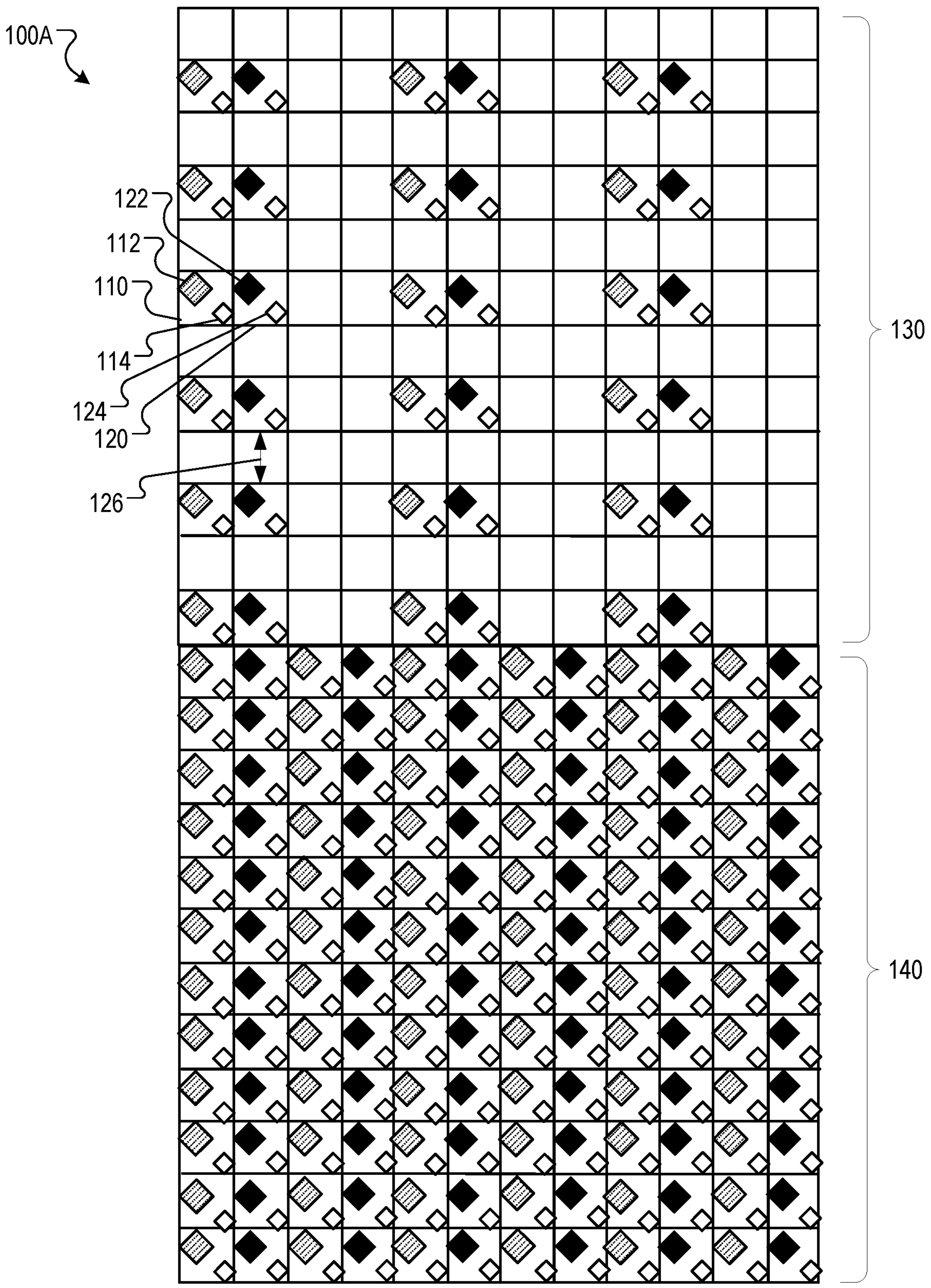
FIG. 1A is a conceptual diagram of a display panel retaining an arrangement of a subset of the pixels that form uneven spaces between the pixels that degrade display of images.

FIG. 1A is conceptual diagram of a display panel 100A retaining an arrangement of a subset of the pixels that form uneven spaces between the pixels that degrade display of images. The display panel 100A includes two different sets of pixels. A first set of pixels includes pixels that include both a red sub-pixel and a green sub-pixel. For example, a pixel 110 is of the first set and includes a red sub-pixel 112 and a green sub-pixel 114. A second set of pixels includes both a blue sub-pixel and a green sub-pixel. For example, a pixel 120 is of the second set and includes a blue sub-pixel 122 and a green sub-pixel 124.

The pixels in the display panel 100A are arranged in a higher resolution area 140 and in a lower resolution area 130. A display panel 100A may be made up columns and rows, where the intersection of columns and rows define cells that may or may not be filled with pixels. For example, the display panel 100A shows twelve columns and twenty four rows for a total of twenty hundred eighty eight cells. In the higher resolution area 140, each cell in the grid may include a pixel. In the lower resolution area 130, only one out of every four cells in the grid includes a pixel. Accordingly, the lower resolution area 130 of the display panel 100A may be considered at a resolution of one quarter pixel density of the higher resolution area 140.

In the lower resolution area 130, the display panel 100A includes pixels that include red sub-pixels adjacent and to the left of pixels that include blue sub-pixels, where the pixels that include red-subpixels are spaced out every four columns and every other row, the only pixels that include blue-subpixels are adjacent and to the right of the red-sub-pixels, where there is no offset between the rows. Accordingly, each red or blue sub-pixel in the lower resolution area 130 of the display panel 100A is adjacent to only a single red or blue sub-pixel.

In the arrangement shown in the display panel 100A, the green sub-pixels are not evenly distributed in the lower resolution area 130 of the display panel 100A. For example, each row includes two green sub-pixels that are adjacent to each other and are spaced out by two columns from the next green sub-pixel. As the green sub-pixels are not evenly distributed, the lower resolution area 130 of the display panel 100A may show green with non-uniform luminance and less detail reproduction. For example, the display panel 100A may show green with a visible pattern that causes a "screen door" effect when looking at featureless images such as uniform fields.

While FIG. 1A shows pairs of red sub-pixels to the left of blue sub-pixels in the lower resolution area 130, the red sub-pixels and the blue sub-pixels may be swapped. For example, the red sub-pixel 112 may be swapped with the blue sub-pixel 122 while keeping the green sub-pixels 114 and 124 in the same position. Swapping red sub-pixels and blue sub-pixels may similarly be done with all the other pixel arrangements shown in the later FIGS. Similarly, the pixel arrangements described herein may be mirrored, rotated, or flipped. For example, a panel that is display panel 100A rotated ninety degrees clockwise may display with similar characteristics to the display panel 100A. In another example, a panel that is display panel 100A flipped along a vertical axis may display with similar characteristics to the display panel 100A. For convenience, FIG. 1A and the display panel 100A below refer to the lower resolution area 130.

Figure 1B:
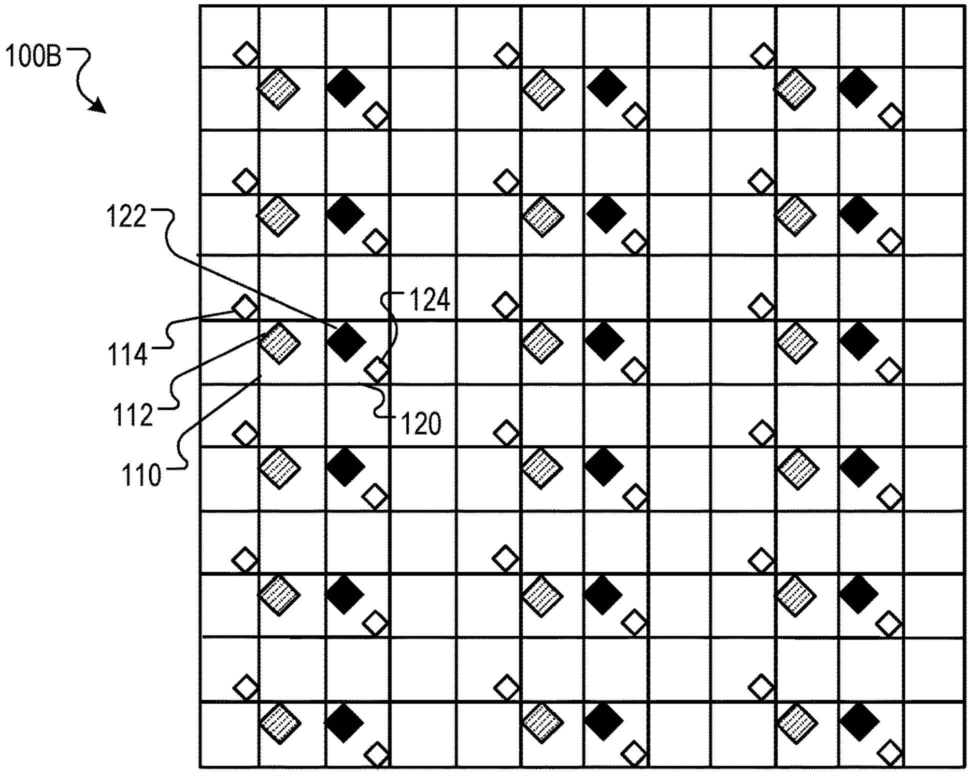
FIG. 1B is a conceptual diagram of a display panel with another arrangement of pixels that form spaces that degrade display of images less than the arrangement in FIG. 1A.

FIG. 1B is a conceptual diagram of a display panel 100B with another arrangement of pixels that form spaces that degrade display of images less than the arrangement in the lower resolution area 130 shown in FIG. 1A. The display panel 100B may degrade display of images less than the arrangement in FIG. 1A as the green sub-pixels in the display panel 100B are more evenly distributed. For example, the display panel 100B may include a green sub-pixel in each row every four columns, and between each row, offset the green sub-pixels by two columns. Accordingly, the display panel 100B may include green sub-pixels in a diamond pattern.

Additionally, in the display panel 100B, a position of the green sub-pixels relative to the red sub-pixels is different than a position of the green sub-pixels relative to the blue sub-pixels. For example, as shown in FIG. 1B, the green sub-pixels in pixels with red sub-pixels is to the upper left of the red sub-pixel and the green sub-pixels in pixels with blue sub-pixels is to the lower right of the blue sub-pixel.

While FIG. 1B shows green sub-pixels to the upper left of the red sub-pixels and the green sub-pixels to the lower right of the blue sub-pixels, the positions may also be swapped. For example, the green sub-pixels in pixels with red subpixels may be to the lower right left of the red sub-pixel and the green sub-pixels in pixels with blue sub-pixels is to the upper left of the blue sub-pixel. In another example, the green sub-pixels in pixels with red sub-pixels may be to the lower left of the red sub-pixel and the green sub-pixels in pixels with blue sub-pixels is to the upper right of the blue sub-pixel.

Figure 1C:
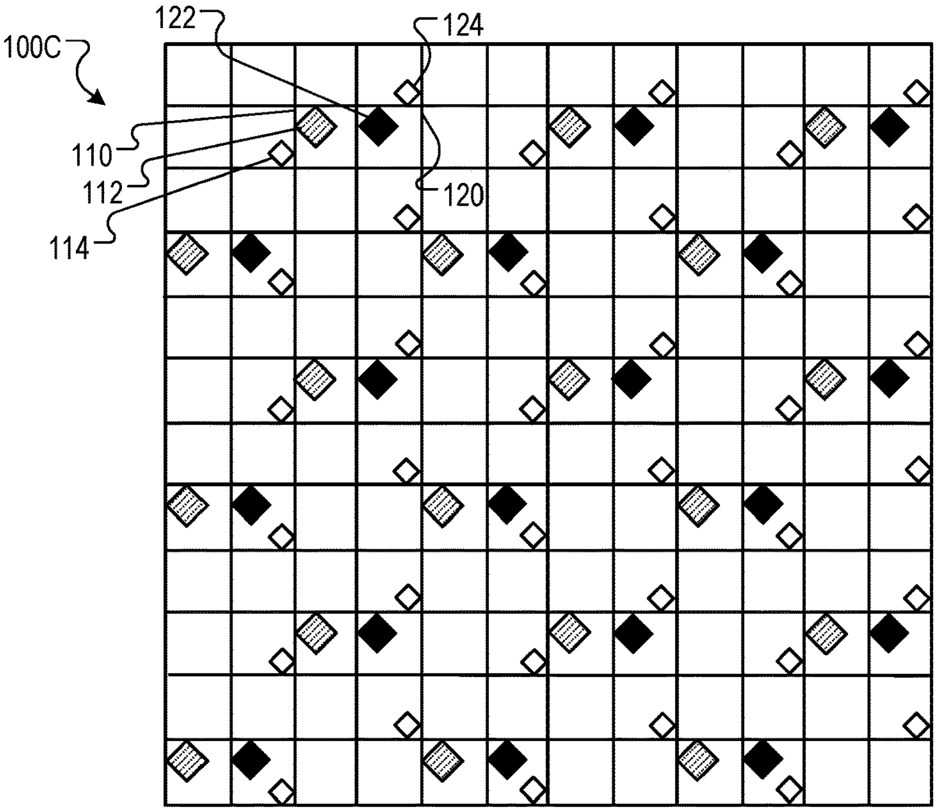
FIG. 1C is a conceptual diagram of a display panel with yet another arrangement of pixels that form spaces that degrade display of images less than the arrangement in FIG. 1A.

FIG. 1C is a conceptual diagram of a display panel 100C with yet another arrangement of pixels that form spaces that degrade display of images less than the arrangement in FIG. 1A. In the display panel 100C, pixels that include red sub-pixels may be spaced apart every four columns and every two rows and offset from one another by two columns every two rows. Pixels that include blue sub-pixels may be adjacent to the right of pixels that include red sub-pixels. As shown in FIG. 1C, the green sub-pixels are also in a diamond pattern. For example, the pixels are arranged along a grid where the green sub-pixels are spaced apart every four columns and are offset by two columns every row.

The display panel 100C may result in a camera below the display panel 100C capturing an image with more haziness than the display panel 100A or the display panel 100B. However, the display panel 100C may display images on the panel with improved resolution in red and blue compared to the display panel 100B as the display panel 100C avoids the column structure of red and blue which the display panel 100B includes.

Figure 2A:
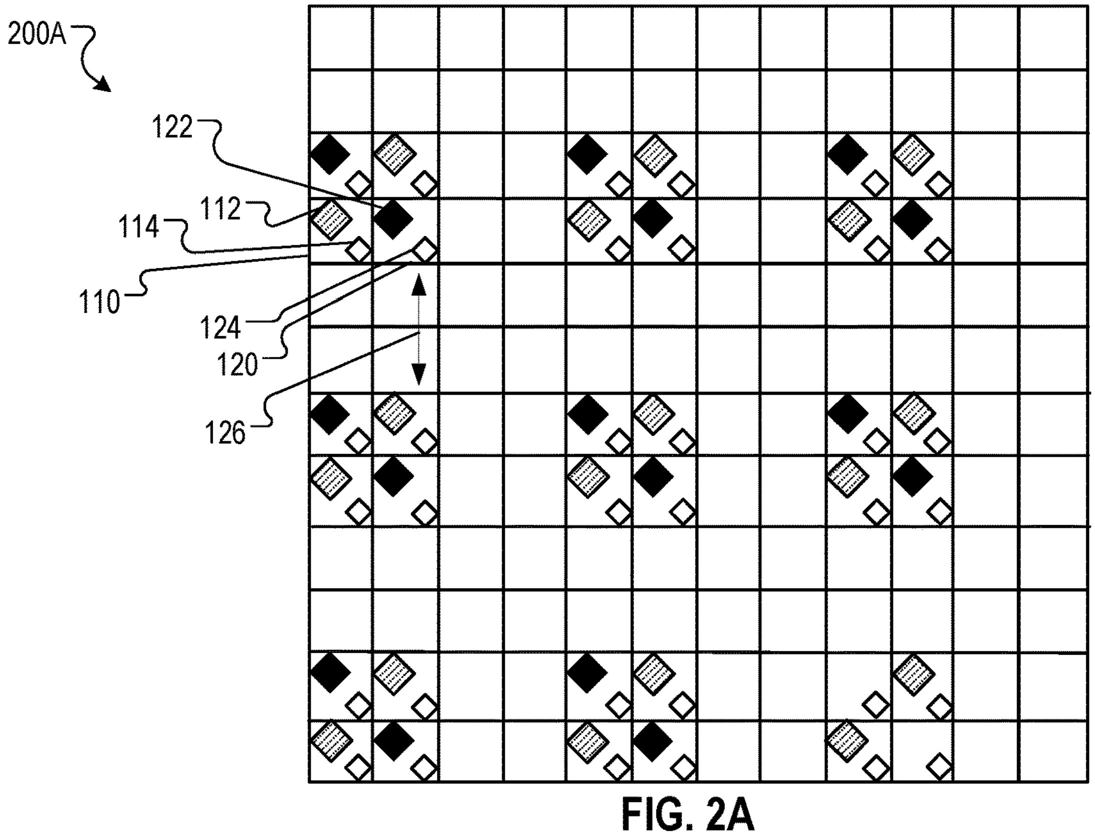
FIG. 2A is conceptual diagram of a display panel that retains a subset of pixels arranged in clusters of pixels with spaces between the pixels that degrade display of images.
Figure 2B:
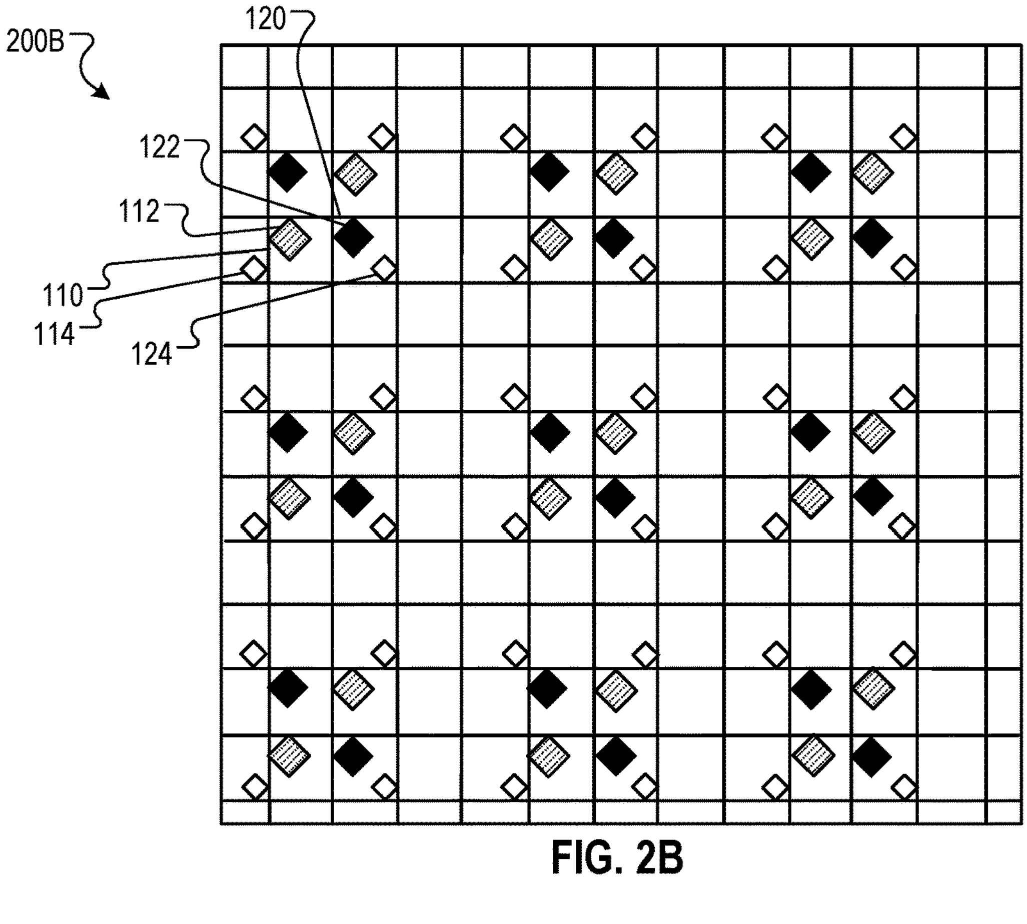
FIG. 2B is a conceptual diagram of a display panel with another arrangement of clusters of pixels that form spaces that degrade display of images less than the arrangement in FIG. 2A.
Figure 2C:
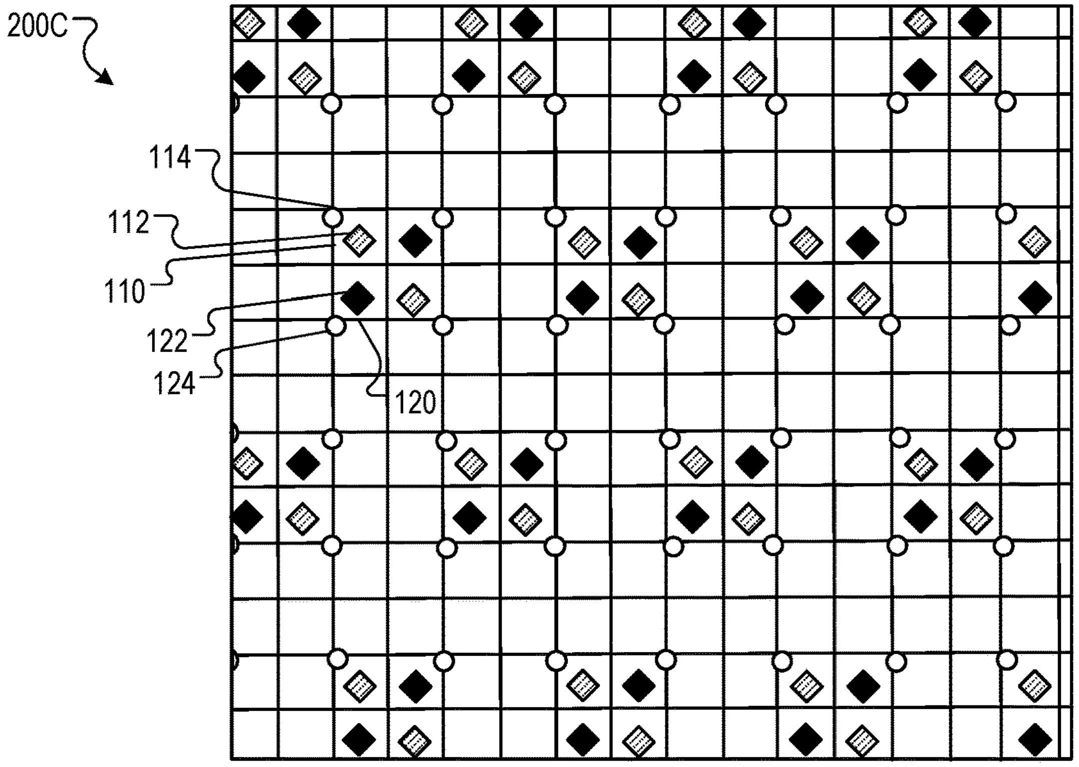
FIG. 2C is a conceptual diagram of a display panel with yet another arrangement of clusters of pixels that form spaces that degrade display of images less than the arrangement in FIG. 2A.

FIGS. 2A-2C illustrate how red sub-pixels and blue sub-pixels may be clustered in more numbers than the pixel arrangement in FIGS. 1A-1C. Clustering pixels may allow a spatial consolidation of driving circuitry and wiring which can improve the quality of the camera images by making the single see-through region in the low resolution region larger than those in FIGS. 1A-1C (the single see-through region 126 labeled in FIG. 1A and FIG. 2A). The clustering may also enable common data signals to be used for same color sub-pixels in a cluster with little image degradation from using separate data signals for each color sub-pixels, but considerable savings in the need for wiring and drive circuitry with benefit to camera image quality.

FIG. 2A is conceptual diagram of a display panel 200A that retains a subset of pixels arranged in clusters of pixels with spaces between the pixels that degrade display of images. The display panel 200A includes two by two clusters of pixels. Each two by two cluster includes two of the pixels that include red sub-pixels and two of the pixels that include blue sub-pixels. In the display panel 200A, the position of the green sub-pixels relative to the red sub-pixels may be the same as the position of the green sub-pixels relative to the blue sub-pixels. As the green sub-pixels are not evenly distributed, the display panel 200A may show green with non-uniform luminance and reduced detail reproduction.

FIG. 2B is a conceptual diagram of a display panel 200B with another arrangement of clusters of pixels that form spaces that degrade display of images less than the arrangement in FIG. 2A. The pixels are arranged along a grid where the green sub-pixels are spaced apart every two columns and every two rows. Additionally, the pixels may be logically clustered into clusters of two by two pixels that each include two pixels that include blue sub-pixels adjacent to each other and two pixels that include red sub-pixels, where the two pixels that include red sub-pixels are also adjacent to each other. The clustering describes one or more of signaling, addressing, or driving the two like colored sub-pixels with a single signal.

In the display panel 200B, a position of the green sub-pixels in the first set of pixels relative to the red sub-pixels is different than a position of the green sub-pixels in the second set of pixels relative to the blue sub-pixels. For example, the green sub-pixel 114 is to the lower left of the red sub-pixel 112 and the green sub-pixel 124 is to the lower right of the blue sub-pixel 122. In the display panel 200B, the clusters are spaced apart every two columns and every two rows, and are not offset from one another between rows. The green sub pixels are spaced evenly on alternating columns and rows.

FIG. 2C is a conceptual diagram of a display panel 200C with yet another arrangement of clusters of pixels that form spaces that degrade display of images less than the arrangement in FIG. 2A. In the display panel 200C, the clusters are spaced apart every two columns and every two rows and are offset from one another by two columns every two rows. The display panel 200C may display images with improved detail reproduction compared to display panel 200A due to the uniform grid spacing of the green pixels. The display panel 200C may display images with improved red and blue uniformity due to the staggered distribution of the clusters.

In some implementations, the display panels 200A-C may be configured such that sub-pixels of a same color in a particular cluster are driven with by the same row and column drive signals. In some embodiments, a pair of adjacent like-colored pixels may be driven by a single pixel drive circuit. For example, the red sub-pixel 112 and the red sub-pixel in the diagonally adjacent cell may both be driven with the same signals and both respond with the same luminance output. They may also be driven by the same pixel circuit so that the sub-pixels always emit light at a same intensity between each other. Driving two sub-pixels with the same pixel circuit may save costs and reduce complexity as less pixel circuits may be needed. Driving two sub-pixels with common address and current wiring may increase the available aperture for camera imaging.

In some implementations, display panels 200A-C may be configured such that sub-pixels of a same color in a particular cluster are driven by different pixel circuits that have a shared address line. For example, the red sub-pixel 112 and the red sub-pixel in the diagonally adjacent cell may be driven by different pixel circuits that share an input so always emit light at a same intensity between each other. Sharing address lines between driving pixel circuits may save costs and reduce complexity as fewer separate address lines to the pixel circuits may be needed. A reduction in the number of address and data lines may also increase the open aperture to improve the image quality of a camera behind the display panel.

Figure 3A:
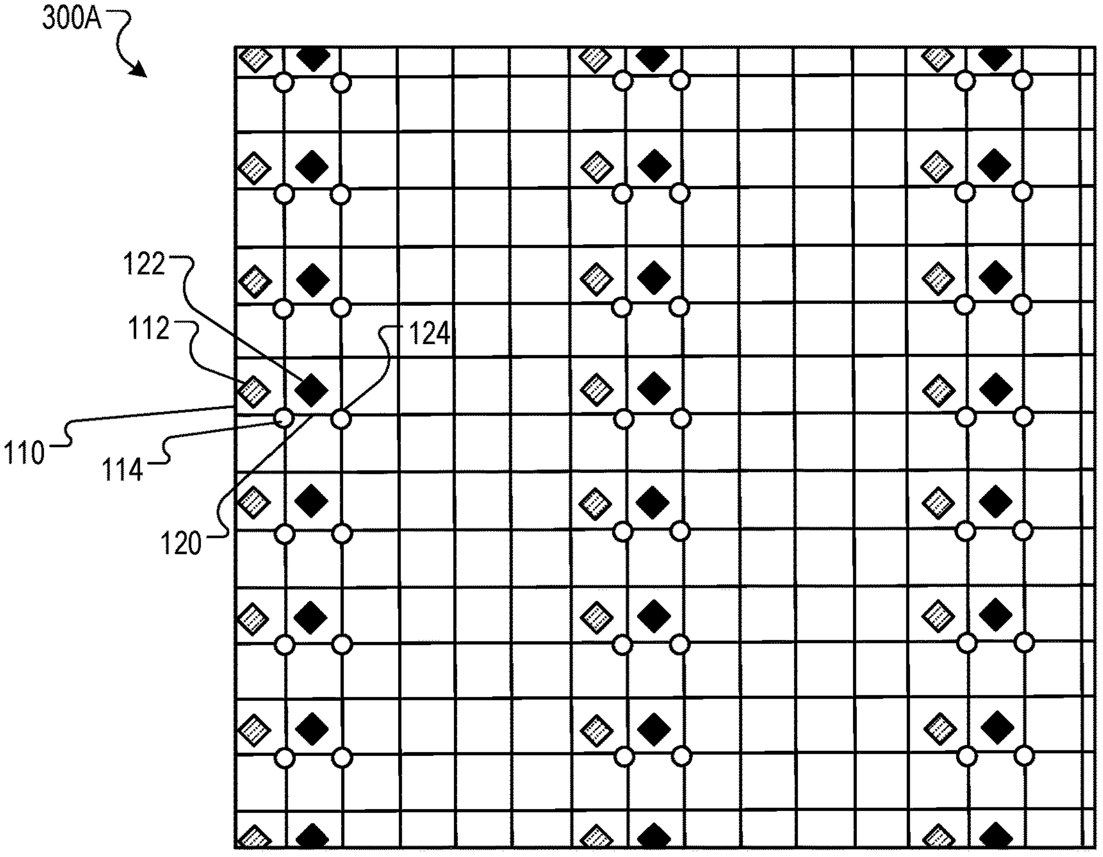
FIG. 3A is conceptual diagram of a display panel with an arrangement of pixels that form spaces between the pixels that degrade display of images.
Figure 3B:
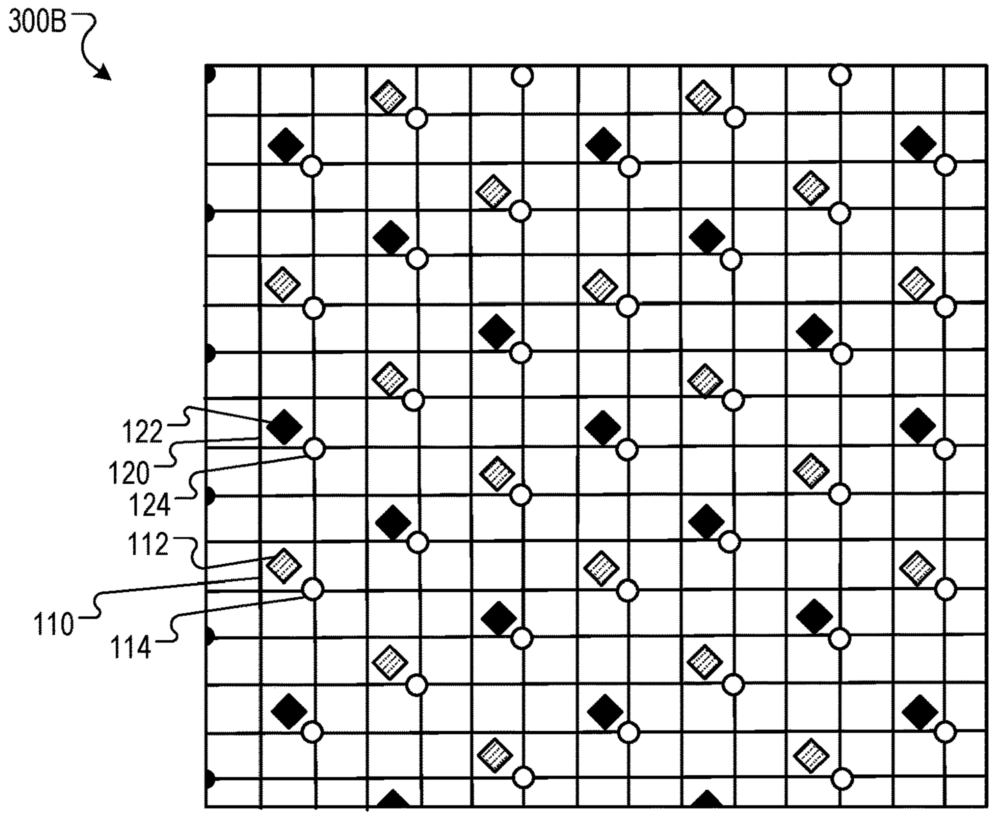
FIG. 3B is a conceptual diagram of a display panel with another arrangement of pixels that form spaces that degrade display of images less than the arrangement in FIG. 3A.
Figure 3C:
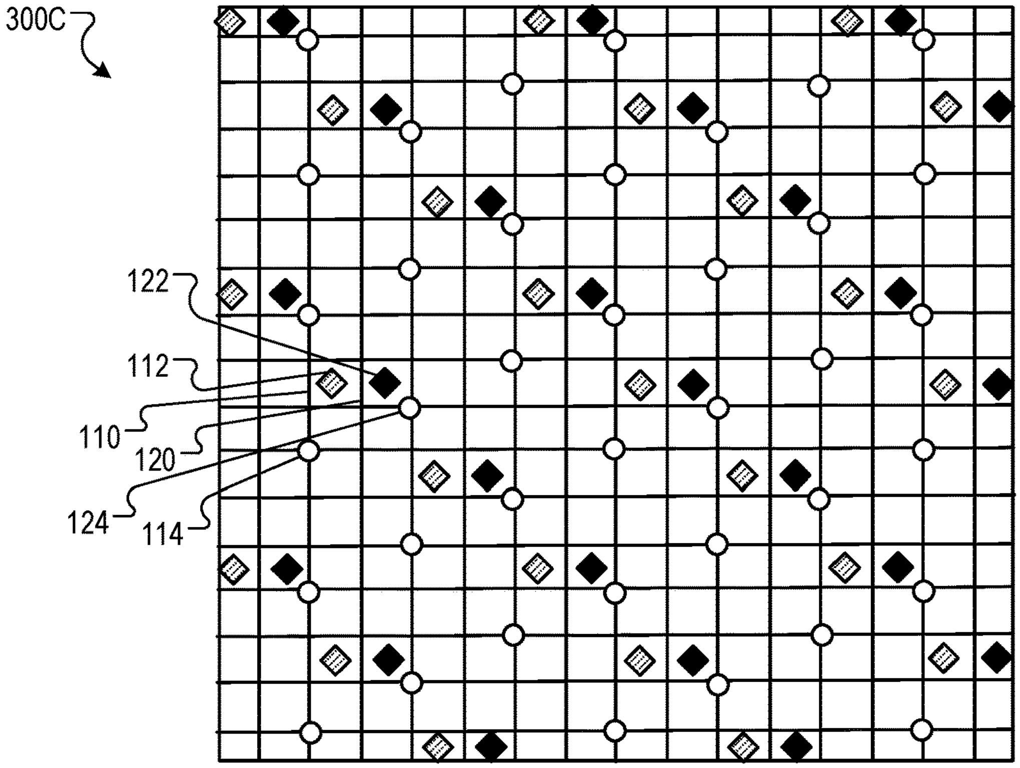
FIG. 3C is a conceptual diagram of a display panel with yet another arrangement of pixels that form spaces that degrade display of images less than the arrangement in FIG. 3A.

FIGS. 3A-3C illustrate pixel arrangements at a resolution of one sixth pixel density of the high resolution region. FIG. 3A is conceptual diagram of a display panel 300A with an arrangement of pixels that form spaces between the pixels that degrade display of images. The pixels in the display panel 300A are arranged in a grid where only one out of every six cells in the grid includes a pixel. Accordingly, the display panel 300A may be considered at one sixth resolution.

FIG. 3B is a conceptual diagram of a display panel 300B with another arrangement of pixels that form spaces that degrade display of images less than the arrangement in FIG. 3A. The display panel 300B includes the pixels arranged such that at least one side of each of the pixels is not adjacent to any pixel, e.g., no pixel is adjacent to another pixel, and pixels are arranged along a grid where the green sub-pixels are spaced apart every six columns and between each row the green sub-pixels are offset by two columns. For example, the rows alternate between including red sub-pixels and blue sub-pixels, where the red or blue sub-pixels in each row are spaced apart by six columns, and between rows offset by two columns to the left. The display panel 300B may display with better quality than the display panel 300A as the pixels in the display panel 300B may be more evenly distributed than in the display panel 300A.

FIG. 3C is a conceptual diagram of a display panel 300C with yet another arrangement of pixels that form spaces that degrade display of images less than the arrangement in FIG. 3A. The display panel 300C may also arrange pixels such that green sub-pixels are spaced apart every six columns and between each row the green sub-pixels are offset by two columns. However, the display panel 300C may allow a camera beneath the display panel 300C to capture better quality images than beneath the display panel 300B due to larger spacing between pixels and/or more clustering of driving circuitry and wiring. However, the display panel 300C may display images with worse quality than the display panel 300B due to the clear and phase aligned oriented diagonal structure of the red and blue pixels.

Figure 4A:
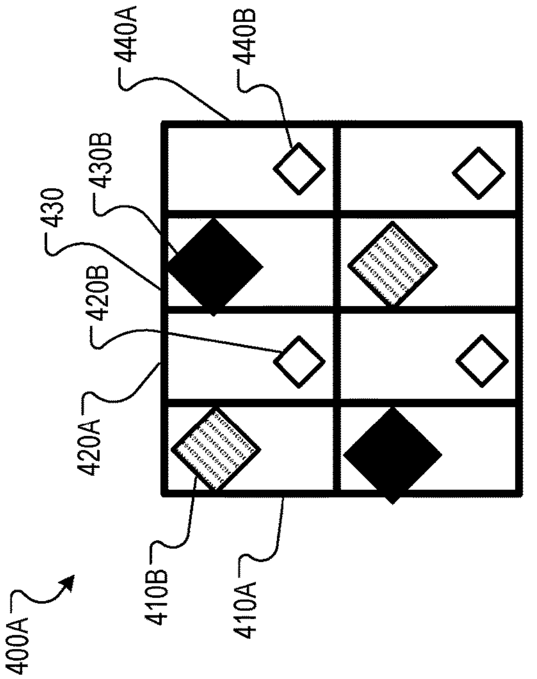
FIG. 4A is a conceptual diagram of positions of sub-pixels relative to pixel circuits that drive the sub-pixels.
Figure 4B:
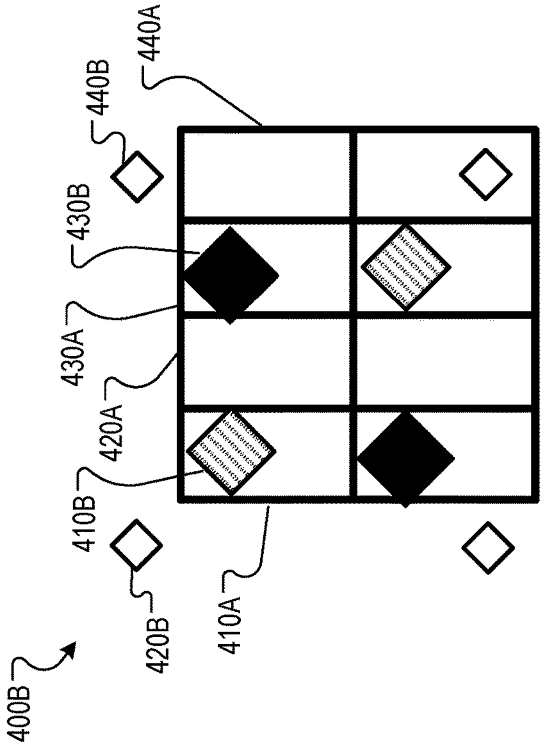
FIG. 4B is a conceptual diagram of different positions of sub-pixels relative to pixel circuits that drive the sub-pixels.

FIGS. 4A and 4B illustrate positions of pixel circuits relative to the sub-pixels driven by the pixel circuits. FIG. 4A is a conceptual diagram 400A of positions of sub-pixels relative to pixel circuits that drive the sub-pixels. The diagram 400A shows how pixel circuit 410A that drives a red sub-pixel 410B may be directly below the red sub-pixel 410B, pixel circuit 420A that drives a green sub-pixel 420B may be directly below the green sub-pixel 420B, pixel circuit 430A that drives a blue sub-pixel 430B may be directly below the blue sub-pixel 430B, and pixel circuit 430A that drives a blue sub-pixel 430B may be directly below the blue sub-pixel 430B.

FIG. 4B is a conceptual diagram 400B of different positions of sub-pixels relative to pixel circuits that drive the sub-pixels. The diagram 400B shows pixel circuit used in the diagram 400B may be used with sub-pixels that are shifted from diagram 400A. For example, in diagram 400B, the pixel circuit 420A that drives the green sub-pixel 420B may no longer be directly under the green sub-pixel 420B. However, the pixel circuit 420A may be electrically coupled to the green sub-pixel 420B through a metallic layer pattern.

Figure 5:
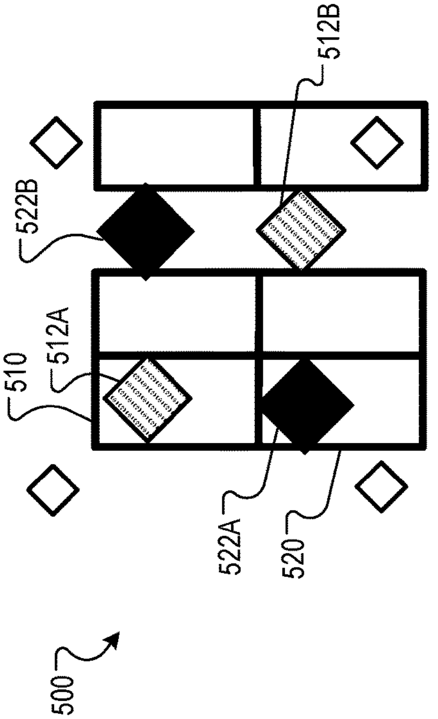
FIG. 5 is a conceptual diagram of multiple sub-pixels being driven by a single pixel circuit.

FIG. 5 is a conceptual diagram 500 of multiple sub-pixels being driven by a single pixel circuit. The diagram 500 shows how both the blue sub-pixel 522A and the blue sub-pixel 522B may be driven by a single pixel circuit 520. The blue-subpixel 522B may not be directly over the pixel circuit 520 but the pixel circuit 520 may be connected to both the blue sub-pixel 522A and the blue sub-pixel 522B. Similarly, the red sub-pixel 512A and the red sub-pixel 512B may be driven by a single pixel circuit 510.

Figure 6:
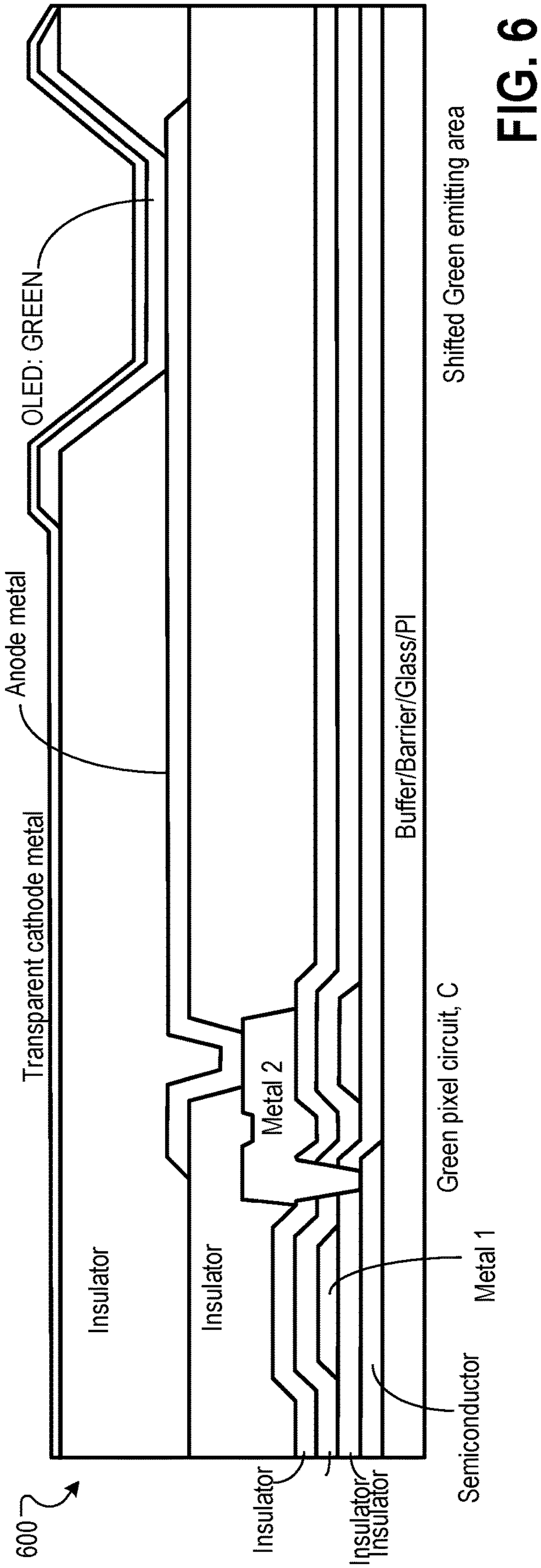
FIG. 6 is a cross-sectional diagram of pixel circuit.

FIG. 6 is a cross-sectional diagram of pixel circuit. The diagram 600 shows multiple layers where a semiconductor drives a green organic light emitting diode that is shifted to not be directly above an emitting area that drives the diode.

Figure 7:
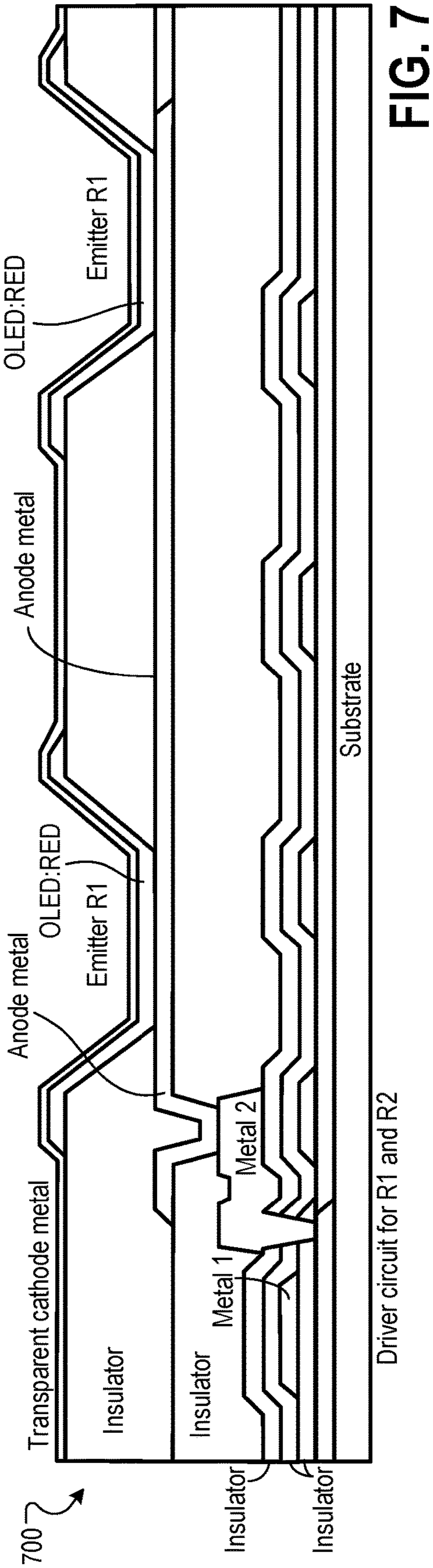
FIG. 7 is a cross-sectional diagram of two subpixels driven together.

FIG. 7 is a cross-sectional diagram of two subpixels driven together. The diagram 700 shows multiple layers where a semiconductor drives two red organic light emitting diodes that are both shifted to not be directly above an emitting area that drives the diodes.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Thus, though particular embodiments of the subject matter have been described. These, and other embodiments, may fall within the scope of the following claims.

What is claimed is:

1. A region of a display panel that forms a grid of cells defined by rows and columns of cells, the region of the display panel comprising:

green sub-pixels that are evenly spaced apart from each other across the region of the display panel; and multiple two-by-two clusters of cells that are each two rows in height and two columns in width, and with each respective cluster of cells of the multiple two-by-two clusters of cells:

(i) including two red sub-pixels and two blue sub-pixels;

(ii) having a single red or a single blue sub-pixel in each cell of the respective cluster, such that the two red sub-pixels and the two blue sub-pixels in each respective cluster are located in different cells; and (iii) having a single green sub-pixel of the green sub-pixels that are evenly spaced apart from each other across the region of the display panel.

2. The region of the display panel of claim 1, wherein each respective cluster of cells of the multiple two-by two clusters of cells has:

a single red sub-pixel in each row of the two rows that form the respective cluster of cells and a single red sub-pixel in each column of the two columns that form the respective cluster of cells, such that the two red sub-pixels in the respective cluster of cells are in cells that are diagonally positioned with respect to each other within the grid of cells; and a single blue sub-pixel in each row of the two rows that form the respective cluster of cells and a single blue sub-pixel in each column of the two columns that form the respective cluster of cells, such that the two blue sub-pixels in the respective cluster of cells are in cells that are diagonally positioned with respect to each other.

3. The region of the display panel of claim 1, wherein the multiple two-by-two clusters of cells form a plurality of rows of two-by-two clusters of cells that are evenly spaced apart from each other.

4. The region of the display panel of claim 3, wherein the plurality of rows of two-by-two clusters of cells are each separated from another by two rows that include no red sub-pixels and no blue sub-pixels.

5. The region of the display panel of claim 3, wherein the multiple two-by-two clusters of cells form a plurality of columns of two-by-two clusters of cells that are evenly spaced apart from each other.

6. The region of the display panel of claim 1, wherein the green sub-pixels that are evenly spaced apart from each other are evenly spaced apart from each other on alternating rows and columns within the grid of cells.

7. The region of the display panel of claim 1, wherein the green sub-pixels that are evenly spaced apart from each other form a grid of green sub-pixels that are located every other cell along a collection of rows and every other cell along a collection of columns.

8. The region of the display panel of claim 1, wherein the region of the display panel includes multiple evenly-spaced rows of cells that are entirely empty.

9. The region of the display panel of claim 8, wherein the region of the display panel includes multiple evenly-spaced columns of cells that are entirely empty.

10. The region of the display panel of claim 1, wherein the region of the display panel includes:

a low-resolution portion of the display panel that includes:

the green sub-pixels that are evenly spaced apart from each other, and the multiple two-by-two-clusters of cells; and a high-resolution portion of the display panel that includes:

green sub-pixels that occupy every cell in the high-resolution portion of the display panel, and red sub-pixels and blue sub-pixels that alternate from cell to cell to collectively occupy every cell in the high-resolution portion of the display panel.

11. The region of the display panel of claim 10, wherein the low-resolution portion of the display panel is configured to permit light to pass through the low-resolution portion of the display panel to a light sensor.

12. The region of the display panel of claim 1, wherein the single green sub-pixel in each respective cluster of cells is located in a same cell as a single red sub-pixel or blue sub-pixel, such that the same cell has only two sub-pixels.

13. The region of the display panel of claim 1, wherein the multiple two-by-two clusters of cells form a plurality of rows of two-by-two clusters of cells that are evenly spaced apart from each other, and that are separated from another by multiple intervening rows of cells that include no red sub-pixels and no blue sub-pixels but include green sub-pixels, with the multiple intervening rows of cells having three green sub-pixels for every one green sub-pixel inside of the two-by-two-clusters of cells.

* * * * *